United States Patent [19]

Yoshikawa et al.

[11] Patent Number: 4,637,298
[45] Date of Patent: Jan. 20, 1987

[54] WINDSHIELD DEFROSTER

[75] Inventors: Hayato Yoshikawa; Manabu Morisaka, both of Toyota, Japan

[73] Assignee: Toyota Jidosha Kabushiki Kaisha, Japan

[21] Appl. No.: 724,545

[22] Filed: Apr. 18, 1985

[30] Foreign Application Priority Data

May 3, 1984 [JP] Japan .............................. 59-65675[U]
Jul. 12, 1984 [JP] Japan ................................ 59-145048

[51] Int. Cl.⁴ ............................................. B60H 1/34
[52] U.S. Cl. ...................................... 98/2.08; 98/2.09
[58] Field of Search ................................ 98/2.08, 2.09

[56] References Cited

U.S. PATENT DOCUMENTS 3,472,146 10/1969 Mazurkiewicz .
3,608,469 9/1971 Mutoh et al. .
4,105,246 8/1978 Trumbull .
4,223,754 9/1980 Mizuno .

FOREIGN PATENT DOCUMENTS 2230776 6/1972 Fed. Rep. of Germany .
31652 3/1980 Japan ..................................... 98/2.09
174049 10/1983 Japan ..................................... 98/2.09

OTHER PUBLICATIONS

The Publication No. 82236/76 of Japanese Utility Model Appln. No. 2344/75.

*Primary Examiner*—Larry I. Schwartz
*Attorney, Agent, or Firm*—Parkhurst & Oliff

[57] ABSTRACT

A windshield defroster assembly for a vehicle dashboard including a defroster outlet having a plate attached therein to control the direction of flow of the heated air. The plate is slanted to direct the flow of the heated air. The bottom edge of the plate remains underneath the bottom surface of the dashboard. Heated air hits the rear surface of the plate, and the blowing direction of the heated air follows along the rear surface of the plate. When the heated air is discharged from the defroster outlet, the heated air is concentrated on an area of the windshield thereby removing frost and moisture from the entire surface of the windshield. A top edge of the plate is disposed at most only slightly over a top surface of the dashboard, so that the plate does not prevent the driver from seeing outside of the vehicle through the windshield.

10 Claims, 12 Drawing Figures

PRIOR ART

Fig. 12

PRIOR ART

WINDSHIELD DEFROSTER

BACKGROUND OF THE INVENTION

The present invention relates to a windshield defroster for a vehicle, and more particularly, to improvements in a control device for controlling the direction of the heated air flow which is discharged from the defroster outlet. The control device increases the efficiency of the windshield defroster.

U.S. Pat. No. 4,105,246 relates to a movable panel used in conjunction with a windshield defroster. The movable panel is placed on the top surface of the vehicle dashboard and a defroster outlet is located between the vehicle windshield and a front edge of the movable panel. The movable panel is mounted on the dashboard in such a manner that it can pivot about a pair of hinge pins. Each hinge pin is positioned on the side edge of the movable panel near the front edge of the panel. The movable panel also includes a raised lip bordering both of its sides and a rear edge which is parallel to the front edge of the movable panel. When the movable panel is moved into a raised position, the raised lip contacts or is in close vicinity to the inside surface of the windshield.

In operation, the defroster outlet discharges heated air into a space defined between the movable panel, the inside surface of the windshield and the raised lip of the movable panel. While the windshield defroster can remove frost or moisture from a restricted area defined on the inside surface of the windshield, the defroster is ineffective is removing frost or moisture from the remainder of the windshield.

Another disadvantage of the movable panel is that when it is moved into its raised position, an operator cannot see outside of the vehicle through the windshield. Also, a recess for storing the movable panel must be provided on the top surface of the dashboard to avoid obstructing the view of an operator through the windshield.

Figure 11:
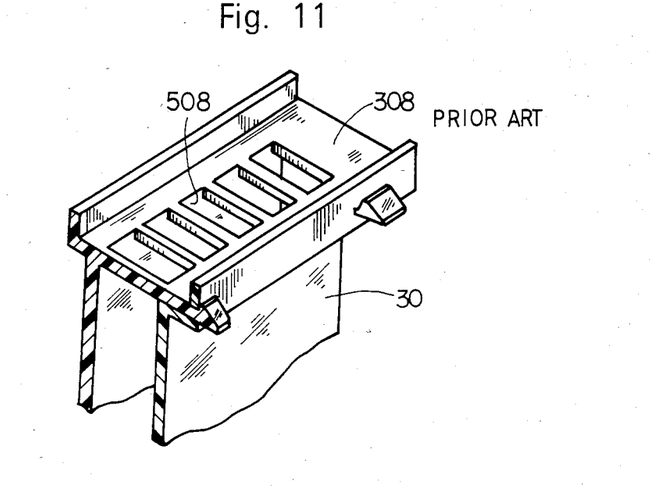
FIG. 11 is an enlarged perspective view showing the arrangement of components around the screen disclosed in Japanese Utility Model Application Laid open No. Showa 51-82236.
Figure 12:
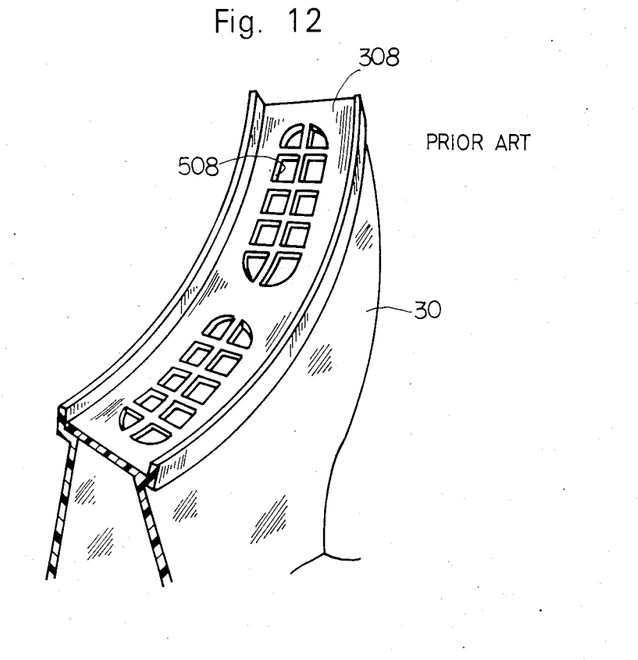
FIG. 12 is an enlarged perspective view showing the arrangement of components around an another screen disclosed in Japanese Utility Model Application Laid open No. Showa 51-82236.

Another prior art approach is disclosed in Janpanese Utility Model Application Laid open No. Showa 51-82236. As illustrated in FIGS. 11 and 12, a windshield defroster includes a defroster duct 30 and a screen 308 having a plurality of openings 508. The screen 308 is disposed on one end of the defroster duct 30 and the screen 308 is integrally and rigidly formed with the defroster duct 30. The screen 308 covers the entire outlet of the defroster duct 30.

However, in fact, it is very difficult to form the defroster duct 30 which has the integral and rigid screen 308. Generally, the screen 308 is separated from the defroster duct 30. Accordingly, the screen 308, while preventing an object from dropping into the defroster duct 30, must be fixed to the duct 30 prior to the windshield defroster being installed into the dashboard of the vehicle. Therefore, this prior art approach increases labor and time requirements during installation of the windshield defroster.

SUMMARY OF THE INVENTION

The present invention has been developed to overcome the disadvantages described above. One object of the present invention is to provide a windshield which effectively removes frost or moisture from the entire windshield without impairing the driver's vision through the windshield.

Another object is to provide a dashboard which does not require a recess for storing a movable panel, thereby maintaining the effectiveness of the windshield defroster.

A further object of the present invention is to provide a defroster duct which is easily installed under the dashboard.

In order to accomplish the above-described objects, a windshield defroster according to the present invention includes a defroster duct having a first outlet and a plate secured to the duct at the first outlet. The plate has a front surface and a rear surface, and a top edge, a bottom edge and two side edges. The top edge of the plate extends slightly over the top surface of the dashboard and the bottom edge remains within the duct near the first outlet.

The plate crosses the defroster duct outlet in a direction parallel to the windshield of the vehicle, so that the plate prevents an object from dropping into the defroster duct.

The front surface or the rear surface of the plate controls the direction of the heated air discharged from the defroster outlet, so that the windshield defroster can effectively remove frost or moisture from the entire windshield.

The plate is secured within the defroster duct outlet and the top edge of the plate projects slightly over the top surface of the dashboard, so that the plate does not impair the driver's vision and the dashboard does not require any recess for storing the plate.

The plate is pre-assembled in the defroster duct outlet and thereafter inserted into the dashboard of the vehicle, so that the installation of the defroster duct under the dashboard requires less labor and time.

BRIEF DESCRIPTION OF THE DRAWINGS

Other objects and novel features of this invention will become more apparent from the description which follows taken in conjunction with the accompanying drawings, in which:

FIG. 8 is an enlarged cross-sectional view of the windshield defroster of a fourth embodiment taken along the lie II—II in FIG. 1;

FIG. 10 is an enlarged perspective view showing the arrangement of components around the screen of a fourth embodiment;

DETAILED DESCRIPTION OF THE PREFERRED EMBODIMENTS

Figure 1:
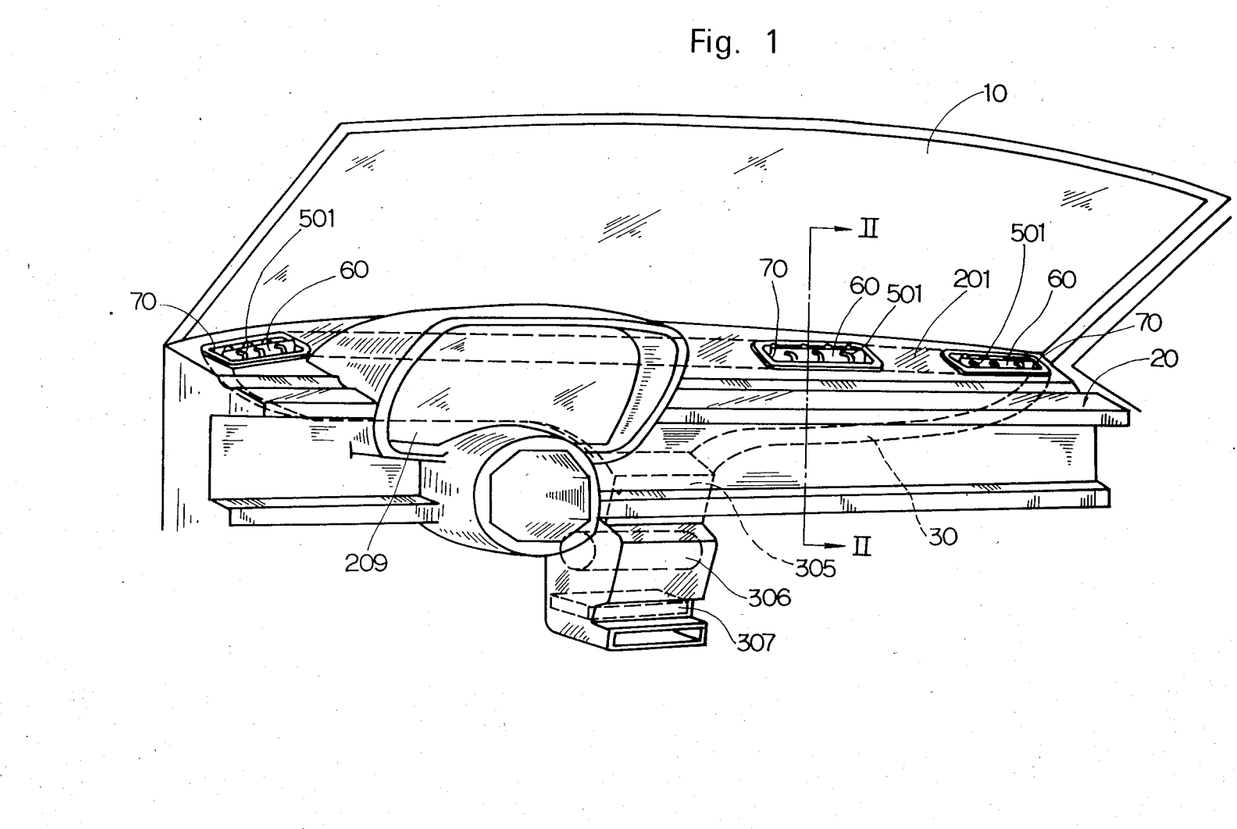
FIG. 1 is a perspective view showing a windshield defroster according to the present invention.

Referring to FIG. 1, a dashboard 20 is positioned at the frontmost portion of a passenger compartment of a vehicle and the dashboard 20 extends in the lateral direction between the sides of the vehicle. A top surface 201 of the dashboard 20 is located under a windshield 10, and the top surface 201 has a plurality of defroster outlets 70. A plate or vane 60 is secured within each defroster outlet 70, and the vane 60 crosses the defroster outlet 70 in a direction parallel to the windshield of the vehicle. A plurality of bars 501 cross over the defroster outlet 70 in a direction perpendicular to the greatest extend of the dashboard 20. An instrument panel 209 is placed on the rear portion of the dashboard 20. A first duct 30, a second duct 305, a blower 306 and a heater 307 are arranged underneath the dash board 20.

Figure 2:
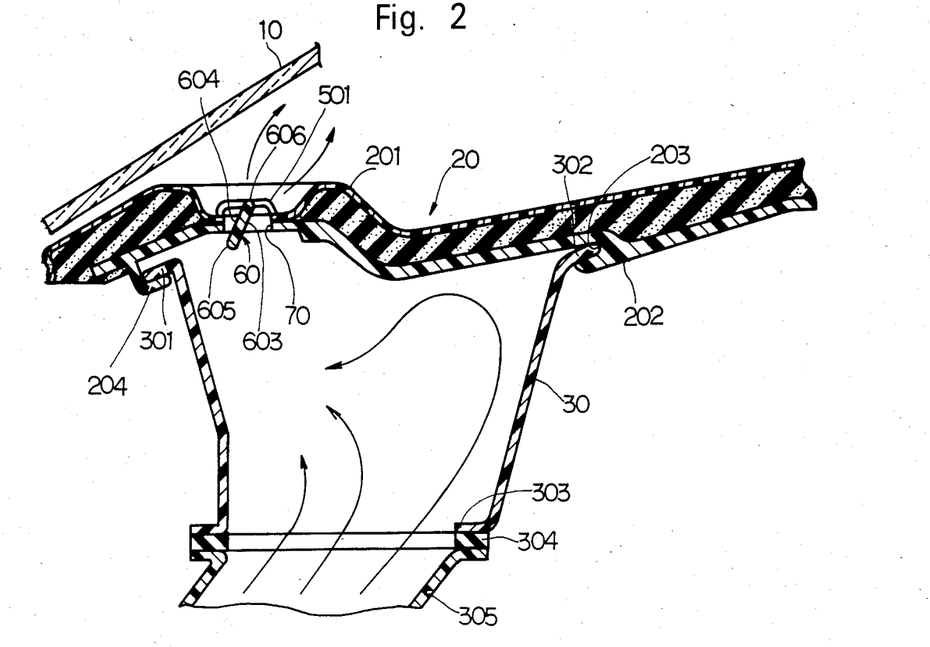
FIG. 2 is an enlarged cross-sectional view of the windshield defroster of a first embodiment taken along the line II—II in FIG. 1.
Figure 3:
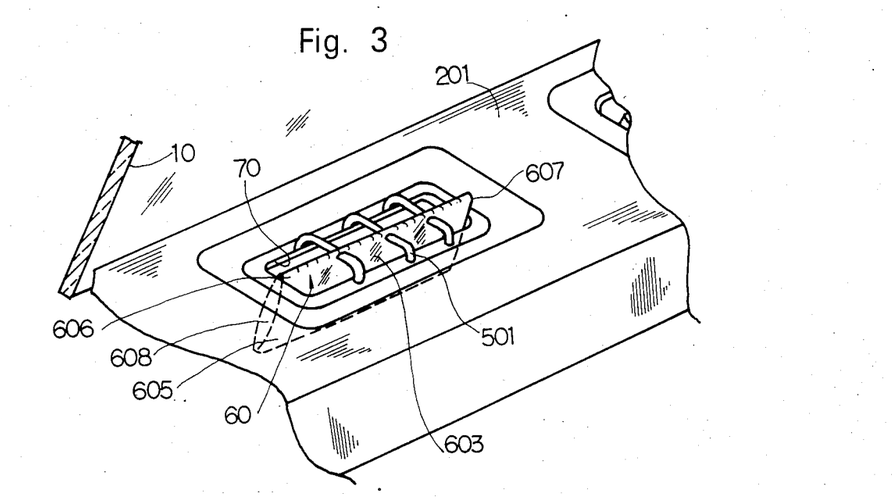
FIG. 3 is an enlarged perspective view showing the arrangement of components around the defroster duct outlet of the first embodiment.

As shown in FIGS. 2 and 3, a defroster outlet 70 is placed in the top surface 201 of dashboard 20 in the front portion thereof under the windshield 10. A duct 30 conveys heated air from a heater 307 to the windshield 10. The duct 30 has a first outlet positioned closer to the dashboard 20 than the second outlet of the duct 30. The vane 60 is secured within the first outlet, and the vane 60 is slanted to the right, as shown in FIG. 2. The vane 60 includes a rear surface 603 and a front surface 604, and the rear surface 603 faces the rear and lower portion of the vehicle. the rear surface 603 is defined by a bottom edge 605, a top edge 606 and two side edges 607 and 608. The bottom edge 605 remains below the bottom surface 202 and the top edge 606 extends slightly above the top surface 201 of dashboard 20. A plurality of defroster outlets 70 are arranged on the top surface 201 of the dashboard 20 and the side edges 607 and 608 of the respective vane 60 are fixed on each respective inner edge of the respective defroster duct outlet. The bar 501 includes two ends and an intermediate portion. The bar 501 crosses over the defroster duct outlet and the two ends of the bar 501 are fixed to the top surface 201 of the dashboard 20. The intermediate portion of the bar 501 is fixed to the top edge 606 of the vane 60 as shown in FIGS. 2 and 3.

The dashboard 20 includes a recess 203 and a hook 204 on the bottom surface 202. The recess 203 is located on the central portion of the bottom surface 202 toward the rear of the vehicle and the recess 203 extends in the lateral direction of the vehicle. The hook 204 is located in the vicinity of the front edge of the bottom surface 202 and the hook 204 extends in the lateral direction of the vehicle.

The first duct 30 has an upper edge which forms a first projection 301 and a second projection 302. The first projection 301 of the first duct 30 is mounted on the hook 204 of the dashboard 20. The second projection 302 of the first duct 30 is inserted into a recess 203 of the dashboard 20, so that the first duct 30 is installed easily on the bottom surface 202 of the dashboard 20. A sealing member 204 is provided between a lower edge 303 of the first duct 30 and a top edge of the second duct 305. This second duct 305 communicates with the heater 307.

The heater 307 is arranged under the dashboard 20 and the heater 307 heats the air. A blower 306 is positioned in the vicinity of the heater 307 and the blower 306 distributes heated air to the defroster outlet 70 of the dashboard 20 through the second duct 305 and the first duct 30. The heated air hits the rear surface 603 of the plate 60 and the blowing direction of the heated air is controlled by the direction of the vane 60. Most of the heated air is discharged in the direction defined by the rear surface 602 of the vane 60, and most of the heated air is concentrated on a specific area of the windshield 10. The remainder of the heated air strikes around the specific area of the windshield 10 and then flows along an inside surface across of the entire windshield 10. Thus, the heated air effectively removes frost or moisture from the entire of the inside surface of the windshield 10.

The windshield defroster includes a bar 501 and a plate 60 placed within the defroster outlet 70, so that bar 501 and vane 60 prevent an object from dropping into the defroster outlet 70. U.S. application Ser. No. 725,552 filed Apr. 22, 1985, which is herein incorporated by reference, is contemporaneous with this application and discloses a windshield defroster having a particular screen arrangement for a defroster outlet. Such a screen arrangement can be included in the embodiments of the present invention.

Figure 4:
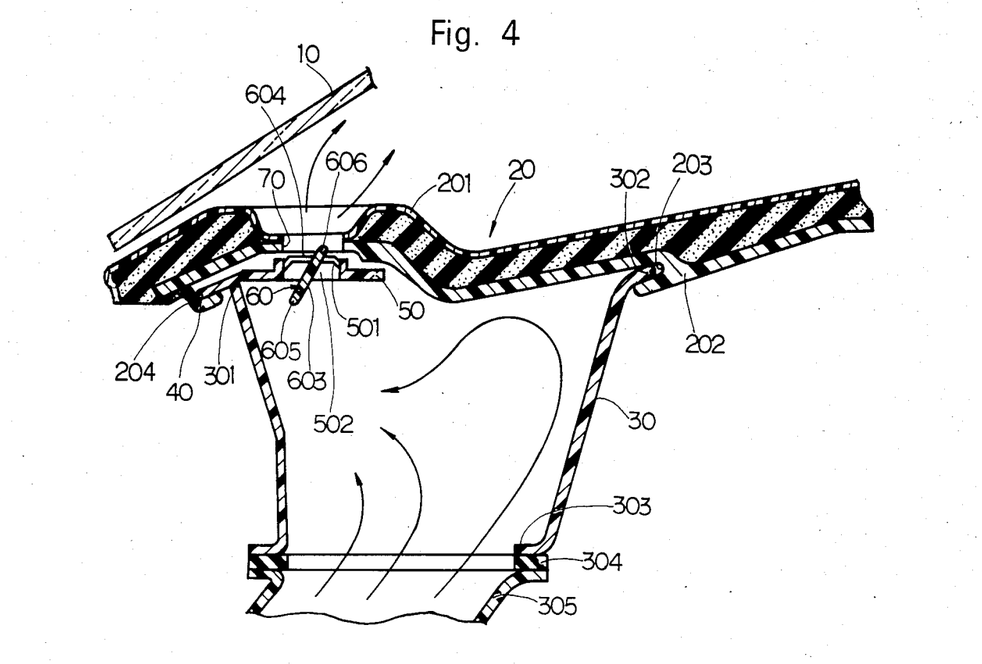
FIG. 4 is an enlarged cross-sectional view of a windshield defroster of a second embodiment taken along the line II—II in FIG. 1.
Figure 5:
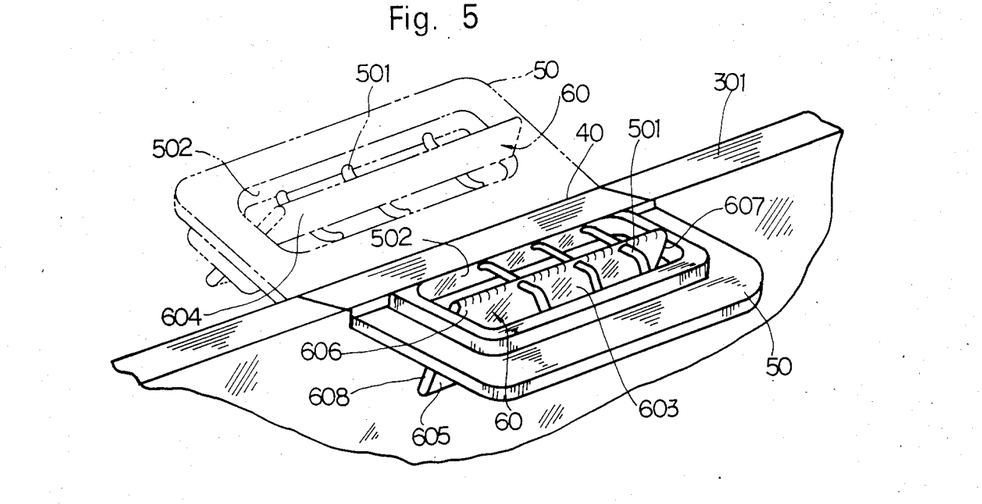
FIG. 5 is an enlarged perspective view showing the arrangement of components around the screen of a second embodiment.

FIGS. 4 and 5 show a windshield defroster of a second embodiment. While most of the components in the second embodiment are the same as the components previously described above for the first embodiment, the second embodiment has several differences.

In the second embodiment, a dashboard 20 has a plurality of inner peripheral edges defining defroster outlet 70. A base plate or screen 50 is positioned in the vicinity of the defroster outlet 70 and under a bottom surface 202 of the dashboard 20. The base plate 50 includes an inner peripheral edge, a plurality of bars 501 and a plate 60. Each bar 501 has two ends. the inner peripheral edge of the base plate 50 defines an opening 502. Each end of each of the plurality of the bars 501 and the sides 607 and 608 of the plate 60 is secured to the inner peripheral edge of the opening 502. the bar 501 is positioned so that it is perpendicular to the top edge 606 of the plate or base 60 and an intermediate portion of the bar 501 is fixed onto the top edge 606 of the vane 60. An upper surface of the base plate 50 faces the bottom surface 202 of the dashboard 20 with a space therebetween, and the opening 502 of the base plate 60 communicates or is congruent with the defroster outlet 70. A front edge of the base plate 50 is connected to the first projection 301 of a duct 30 through an integral hinge 40.

As shown in FIG. 5, the base plate 50 may rotate about the front edge of the first projection 301 of the duct 30.

In this second embodiment, even though the top edge 608 of the vane 60 does not project over a top surface 201 of the dashboard 20, the base plate 50 still controls the direction of discharge of the heated air.

It is apparent that the base plate 50 may be fixed securely on the bottom surface 202 of the dashboard, or the front edge of the base plate 50 may be fixed securely on the first projection 301 of the duct 30.

Figure 6:
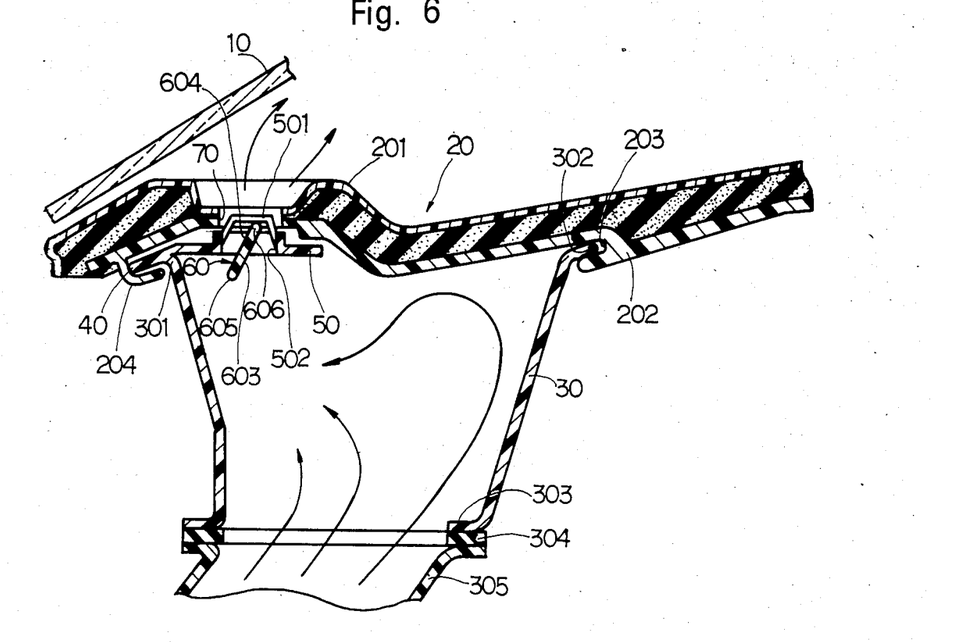
FIG. 6 is an enlarged cross-sectional view of a windshield defroster of a third embodiment taken along the line II—II in FIG. 1.
Figure 7:
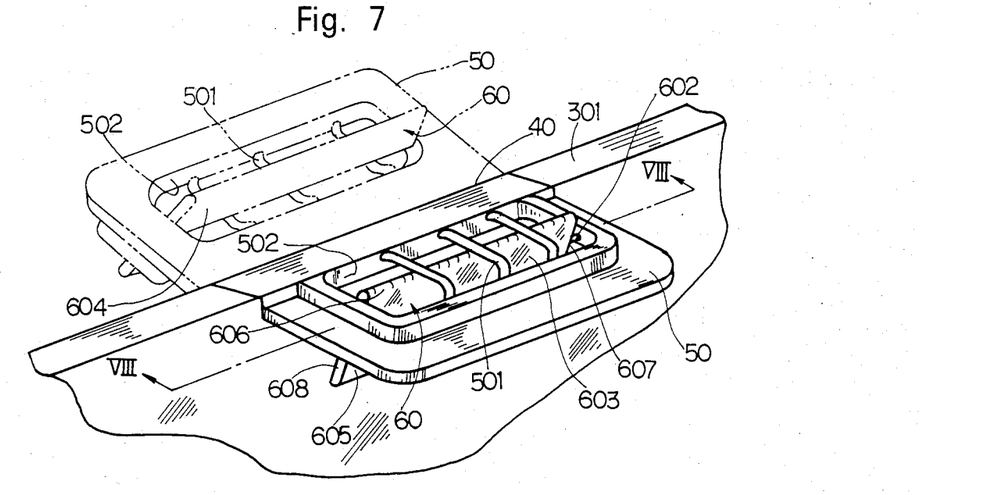
FIG. 7 is an enlarged perspective view showing the arrangement of components around the screen of a third embodiment.
Figure 8:
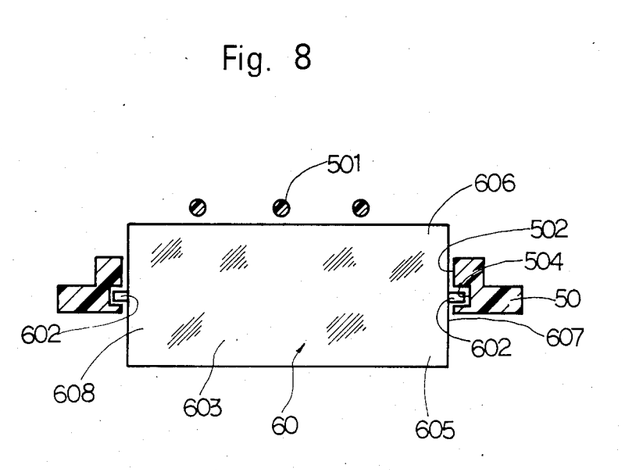
FIG. 8 is an enlarged cross-sectional view of the screen of a third embodiment taken along the line VIII—VIII in FIG. 7.

FIGS. 6, 7 and 8 disclose a windshield defroster of a third embodiment. While most of the components in the third embodiment are the same as the components previously described above for the second embodiment, the third embodiment has several differences.

In the third embodiment, a base plate or screen 50 includes an inner peripheral edge to which a rudder 60 and a plurality of bars 501 are attached. The inner peripheral edge of the base plate 50 defines an opening 502, and the inner peripheral edge of the base plate 50 contains a pair of cavities 504 which face each other. The rudder 60 has a hinge pins 602 on both sides 607 and 608 thereof. Each of the hinge pins 601 are inserted into a respective cavity 504, and the hinge pins 602 lie on the axis of the rudder 60. Therefore, the rudder 60 can rotate about the axis of the rudder 60 within the opening 502 of the base plate 50. The bar 501 crosses over the opening 502 of the base plate 50 and each end of the bar 501 fixed on the inner peripheral edge of the base plate 50. The bar 501 is positioned so that it is perpendicular to the top edge 606 of the rudder 60, and an intermediate portion of the bar 501 crosses over the top edge 606 of the rudder 60. The intermediate portion of the bar 501 is positioned within the defroster outlet 70 in dashboard 20, such that the bar 501 does not prevent the rudder 60 from rotating within the opening 502 of the base plate 50.

In this third embodiment, the top edge 606 of the rudder 60 is disposed slightly under the top surface 201 of the dashboard 20, so that an operator can manually rotate the rudder 60 through the defroster outlet 70. The direction of discharge of the heated air can be changed easily by changing the orientation fo the rudder 60. Thus, the windshield defroster according to the present invention can remove more effectively frost or moisture from the entire inside surface of the windshield 10. This is a significant improvement over known defroster assemblies.

It is apparent that the front surface 604 and rear surface 603 of the rudder 60 could come into contact with the inner edge of the base plate 50 if the distance defined between the axis of the rudder 60 and the top edge 606 of the rudder 60 is longer than a distance defined between the axis of the rudder 60 and the inner peripheral edge of the screen 50.

Figure 9:
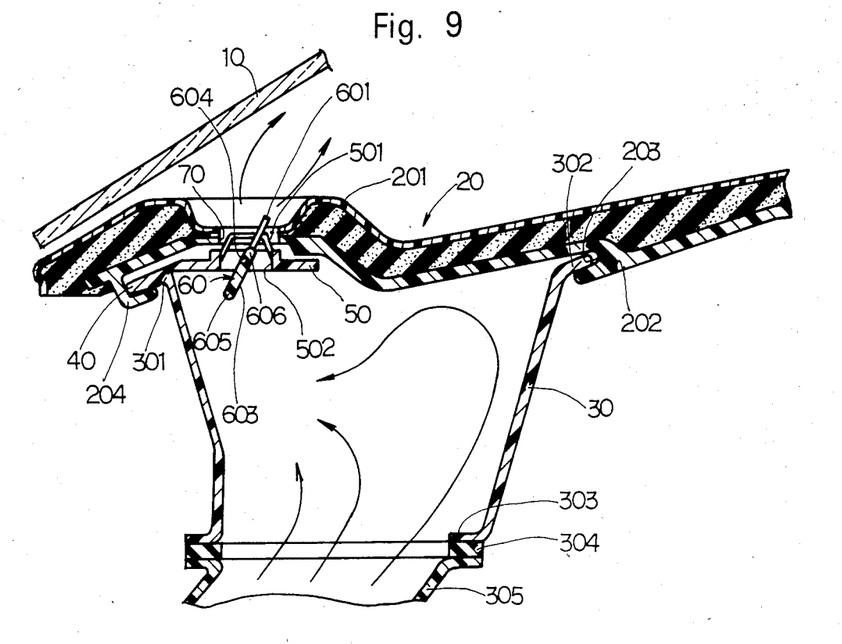
Figure 10:
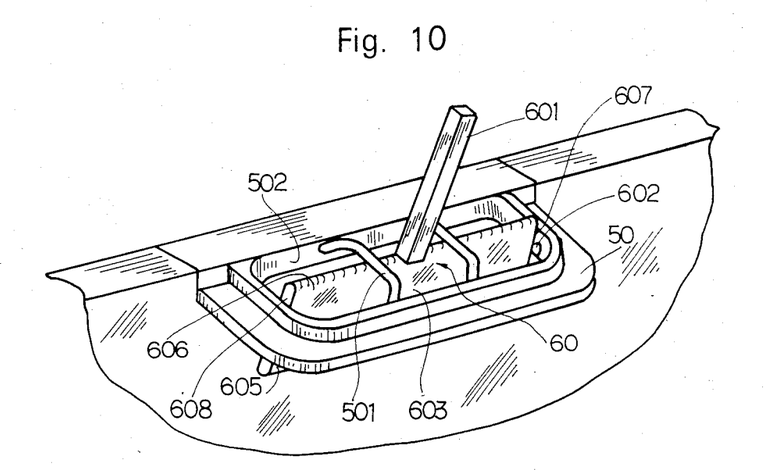

FIGS. 9 and 10 show a windshield defroster of a fourth embodiment. While most of components in the fourth embodiment are the same as the components previously described above for the third embodiment, the fourth embodiment has several differences.

In the fourth embodiment, a rudder 60 has a stick 601 which is secured to the top edge 606 of the rudder 60. The top end of the stick 601 projects over the top surface 201 of a dashboard 20, so that an operator can easily rotate the rudder 60. Further rotation of the rudder 60 is prevented by the intermediate portion of the stick 601 contacting the inner peripehral edge of the defroster outlet 70.

Each of the embodiments described above illustrates a windshield defroster of the present invention which effectively removes frost or moisture from the entire windshield surface of a vehicle without impairing the vision of a driver through the windshield.

It should be apparent to those skilled in the art that the above-described embodiments are merely illustrative of a few of the many possible specific embodiments of the present invention. Various arrangements can be devised readily by those skilled in the art without departing from the spirit and scope of the invention.

What is claimed is:

1. A windshield defroster assembly, comprising:
    a duct which conveys heated air from a heat source to a windshield, said duct having a first outlet, a second outlet, and an upper edge around the first outlet, said first outlet having an inner edge, said duct being installed in a vehicle dashboard having an aperture, a top surface, a bottom surface, and a hook, said first outlet being positioned closer to said dashboard top surface than said second outlet, said upper edge having first and second projections which project outwardly from said duct, said first projection being mounted on said hook, said second projection being inserted in a recess in said bottom surface of said dashboard;
    a vane positioned at said first outlet of said duct, said vane having a top edge, a bottom edge, and a control surface defined betwen said top and bottom edge, said vane being located at said first outlet such that said top edge of said vane extends through said dashboard top surface and out of the duct at said first outlet and said bottom edge of said vane remains within said duct near said first outlet, whereby heated ar conveyed through said duct from said heat source to said windshield follows along the control surface of said vane at the first outlet of said duct; and
    a bar crossing over said aperture, said bar being perpendicular to said top edge of said vane, said bar having two ends, each of said ends being secured to the top surface of said dashboard, and said bar having an intermediate portion, said intermeidate portion being secured to said top edge of said vane.

2. A windshield defroster assembly as set forth in claim 1, wherein said vane has a pair of side edges between said top edge and said bottom edge, and each of said side edges of said vane being secured to an inner edge of said aperture.

3. A windshield defroster assembly comprising:
    a duct which conveys heated air from a heat source to a windshield, said duct having a first outlet, a second outlet, and an upper edge around said first outlet, said first outlet having an inner edge, said duct being installed in a vehicle dashboard, said dashboard having an aperture, a top surface, a bottom surface, and a hook, said first outlet being positioned closer to said dashboard top surface than said second outlet, said upper edge having first and second projections which project outwardly from said duct, said first projection being provided on said hook, said hook projecting from said bottom surface of said dashboard, said bottom surface of said dashboard having a recess in which the second projection of said duct is inserted;
    a base plate secured within said duct adjacent said first outlet and projecting within said first outlet, said base plate having a top surface, a bottom surface, an inner peripheral edge defining an opening, and an edge fixed to the inner edge of said first outlet of said duct; and
    a bar crossing over said opening of said base plate said bar being approximately perpendicular to said top edge of said vane, said bar having two ends, each of said two ends being secured to the upper surface of said base plate, and said bar having an intermediate portion between said two ends, said intermediate portion being secured to said top edge of said vane.

4. The windshield defroster assembly as set forth in claim 3, wherein the base plate is mounted on the bottom surface of said dashboard.

5. The windshield defroster assembly as set forth in claim 3, wherein said vane has a pair of side edges between said top edge and said bottom edges, each of said side edges being secured to the second inner peripheral edge of said base plate.

6. The windshield defroster assembly as set forth in claim 3, wherein the opening of said base plate communicates with said first outlet.

7. A windshield defroster assembly comprising:
a duct which conveys heated air from a heat source to a windhsield, said duct being installed in a vehicle dashboard and having a first outlet, a second outlet and an upper edge around said first outlet, said first outlet having an inner edge, said dashboard having an aperture and a top surface, said first outlet being positioned closer to said dashboard top surface than said second outlet, said upper edge having first and second projections projecting outwardly from said duct, said dashboard having a bottom surface and a hook projecting from said bottom surface, said first projection being mounted on said hook, said bottom surface having a recess in which the second projection of said duct is inserted;
a base plate secured within said duct adjacent said first outlet and projecting within said first outlet, said base plate having a top surface, a bottom surface, an inner peripheral edge defining an opening, and an edge fixed to the inner edge of said first outlet of said duct;
a rudder secured within the opening of said base plate, said rudder having an axis and said rudder being rotatably mounted on said inner peripheral edge of said base plate, said rudder having a hinge pin which extends parallel to the windshield of a vehicle, said hinge pin being on the axis of said rudder, whereby said rudder rotates about said pin; and
a control surface formed on said rudder, whereby the heated air conveyed through said duct from said heat source to said windshield follows along the control surface of said rudder at the first outlet of said duct.

8. The windshield defroster assembly as set forth in claim 7, further comprising at least one bar crossing over said opening in said base plate and said rudder, said at least one bar being approximately perpendicular to said rudder.

9. The windshield defroster assembly as set forth in claim 7, further comprising a stick having a first end and a second end, said first of said stick extending over the top surface of said dashboard, said second end of said stick being fixed to said rudder.

10. The windhsield defroster assembly as set forth in claim 7, wherein said opening of said base plate communicates with said first outlet of the duct.

* * * * *